US010668768B2

(12) United States Patent
Spahr et al.

(10) Patent No.: US 10,668,768 B2
(45) Date of Patent: Jun. 2, 2020

(54) HUB AND WHEEL

(71) Applicant: DT SWISS INC., Grand Junction, CO (US)

(72) Inventors: Stefan Spahr, Lengnau (CH); Simon Haas, Feldbrunnen (CH)

(73) Assignee: DT SWISS INC., Grand Junction, CO (US)

( * ) Notice: Subject to any disclaimer, the term of this patent is extended or adjusted under 35 U.S.C. 154(b) by 324 days.

(21) Appl. No.: 15/493,927

(22) Filed: Apr. 21, 2017

(65) Prior Publication Data

US 2017/0305188 A1    Oct. 26, 2017

(30) Foreign Application Priority Data

Apr. 26, 2016   (DE) .......................... 10 2016 107 755

(51) Int. Cl.
*B60B 1/04*   (2006.01)
*B60B 1/00*   (2006.01)
(Continued)

(52) U.S. Cl.
CPC .............. *B60B 1/042* (2013.01); *B60B 1/003* (2013.01); *B60B 1/041* (2013.01); *B60B 27/023* (2013.01);
(Continued)

(58) Field of Classification Search
CPC ......... B60B 1/003; B60B 1/02; B60B 1/0223; B60B 1/0246; B60B 1/042
See application file for complete search history.

(56) References Cited

U.S. PATENT DOCUMENTS 491,937 A * 2/1893 Copeland .............. B60B 1/0223
                                                                301/56
492,578 A * 2/1893 Fay ....................... B60B 1/0223
                                                                301/56
(Continued)

FOREIGN PATENT DOCUMENTS

EP           1894645 A1    3/2008
GB           2329618 A     3/1999

OTHER PUBLICATIONS

German Search Report from German Patent Application No. 10 2016 107 755.0, dated Dec. 30, 2016.
(Continued)

*Primary Examiner* — Jason R Bellinger
(74) *Attorney, Agent, or Firm* — Greer, Burns & Crain, Ltd.

(57) ABSTRACT

A hub and a wheel having such a hub. The hub includes a hub shell and an axle to rotatably receive the hub shell. The hub shell is provided with circumferential hub flanges for accommodation and defined orientation of a plurality of spokes. Each of the spokes includes a spoke body and a spoke head. The hub flanges include a plurality of accommodation sections to receive one spoke head each. The accommodation sections are axially disposed on the hub flanges. Each of the accommodation sections has one spoke feed-through assigned to it, through which an accommodated spoke can be guided out of the accommodation section. Two spoke feed-throughs each are provided with one joint and circumferentially closed outlet opening in the hub flanges. The hub flanges enclose the outlet opening integrally.

22 Claims, 6 Drawing Sheets

(51) Int. Cl.
  *B60B 27/02* (2006.01)
  *B60B 1/02* (2006.01)
(52) U.S. Cl.
  CPC ....... *B60B 1/0238* (2013.01); *B60B 2900/114* (2013.01); *B60B 2900/311* (2013.01)

(56) References Cited

U.S. PATENT DOCUMENTS

| | | |
|---|---|---|
| 553,616 A | 1/1896 | Handloser |
| 5,429,421 A | 7/1995 | Watson |
| 5,626,401 A * | 5/1997 | Terry, Sr. ................. B60B 1/003 |
| | | 301/104 |
| 6,010,197 A * | 1/2000 | Crosnier ............... B60B 27/023 |
| | | 301/110.5 |
| 6,352,314 B1 | 3/2002 | Tabe |
| 6,485,108 B1 * | 11/2002 | Tabe ....................... B60B 1/041 |
| | | 301/110.5 |
| 7,967,392 B2 | 6/2011 | Meggiolan |
| 2004/0130204 A1 | 7/2004 | Schlanger |
| 2006/0006730 A1 | 1/2006 | Meggiolan |
| 2011/0193403 A1 | 8/2011 | Chen |

OTHER PUBLICATIONS

European Search Report from European Patent Application No. 17168269.3, dated Nov. 6, 2017.

\* cited by examiner

HUB AND WHEEL

CROSS REFERENCE TO RELATED APPLICATIONS

This application claims priority to German Patent Application No. 102016107755.0 on Apr. 26, 2016, which is incorporated herein by reference.

BACKGROUND

The present invention relates to a hub and a wheel for an at least partially muscle-powered, two-wheeled vehicle and in particular to a bicycle.

In the area of sports and also in competitive sports, bicycle components tend to be required which are particularly lightweight while also being very sturdy. Thus, for example wheels having straight or non-cranked spokes have been disclosed offering a low weight combined with high stability. These wheels require hubs having a hub flange suitable to receive straight respectively non-cranked spokes.

The prior art has disclosed hubs whose hub flanges show a plurality of tangential or radial bores. The spokes are inserted through these and retained in the mounted state. To ensure stable accommodation for each spoke, thus also allowing crossed spokes, the flange configuration needs to show a suitable width. This results in a very inconvenient weight of these hubs.

Another disadvantage of the known hubs is the hub flange diameter that tends to be very large, since the straight spokes need space during mounting. Spoking is a particular problem, for example with hubs having a rotor or a brake disk accommodation. Therefore, the hub flanges tend to be configured with a very large diameter in these positions which adversely affects the weight of the hub. Moreover, large or wide hub flanges offer a large surface for wind action and therefore tend to show poor aerodynamics.

Therefore, the prior art has disclosed hubs suitable for accommodating straight spokes, while also showing a compact hub flange configuration. To enable ease of spoking, the hub flange is as a rule provided with large-area recesses or multiple-slit configurations. However, this often results in considerable structural weakening of the hub flange.

It is therefore the object of the present invention to provide a hub and a wheel which offer an accommodation for the spokes in the hub flange that is both stable and compact.

SUMMARY

The hub according to the invention is provided with a hub shell. The hub shell is suitable and configured for rotatable arrangement relative to at least one axle received in the hub shell. The hub shell is provided with at least one circumferential hub flange. The hub flange serves for accommodation and defined orientation of a plurality of spokes. Each of the spokes comprises in particular a spoke body and a spoke head. The spoke head is in particular flattened. The hub flange comprises a plurality of accommodation sections to accommodate one spoke head each. The accommodation sections are in particular at least partially axially disposed in the hub flange. One spoke feed-through is assigned to each of the accommodation sections. The spoke feed-through allows to guide an accommodated spoke out of the accommodation section. The hub flange is provided with a circumferentially closed, shared outlet opening for at least two spoke feed-throughs each. The hub flange in particular integrally encloses the outlet opening.

The hub according to the invention has many advantages. It is a considerable advantage that the shared, circumferentially closed outlet opening requires only a small quantity of bores or recesses in the hub flange. This achieves high stability combined with a compact structure of the hub flange. For example, the shared outlet opening allows to reduce the quantity of bores by half over conventional hubs which results in a considerable gain of stability without a significant weight increase. Moreover, the spokes are reliably secured against inadvertent unscrewing in this way. Namely, this outlet opening particularly advantageously enables the two accommodated spokes to block one another from unintended exiting from the outlet opening.

Moreover, both spokes can thus be disposed particularly far axially outwardly. Also, there is no material between the two spokes so that the spokes for example may, and preferably do, contact one another. Both these measures contribute to allow the mounting of the axially inwardly spokes to the wheel at an angle that is less steep than is required in other constructions. Moreover, the overall axial wheel stiffness will be particularly high combined with a particularly low weight. Moreover, the hub according to the invention enables a particularly small radial extension of the hub flange so that hub flanges may be realized showing very small diameters so that the weight of the hub can be reduced still further.

It is also a particular advantage that the hub flange encloses the outlet opening integrally. This achieves for one, a high stability of the hub while providing a convenient weight. This is particularly decisive in high performance components, respectively in the field of competitive sports. For another, the spokes are effectively prevented from exiting unintendedly during mounting and also in bicycle operation without requiring to attach covers or locks. Moreover, if such a cover loosens or is lost, dangerous falls may result.

In particular, the term "integrally" is understood as one-piece made. Preferably, the hub flange encloses the outlet opening in a one-piece manner. The hub flange is preferably made of one piece.

In particular, at least two spoke feed-throughs terminate within one single, circumferentially closed outlet opening in the hub flange.

In particular, two spokes exit from the hub flange from one single, circumferentially closed outlet opening in the hub flange.

The outlet opening is in particular circumferentially closed in such a way that a spoke cannot axially exit from the spoke feed-through. The spoke feed-throughs are in particular circumferentially closed as well, at least in sections.

The outlet openings are preferably disposed on a radial top face of the hub flange. The outlet opening in particular only extends over the radial top face. The outlet opening in particular does not extend over an axially inwardly surface and/or axially outwardly surface of the hub flange. Alternately, it is possible for the outlet opening to extend over an axially inwardly surface and/or outwardly surface at least in sections. Preferably, a portion of the circumference of the outlet opening and/or a portion of the outlet opening surface on or at the radial top face extends over more than 50% and in particular more than 75% and preferably more than 90% of the entire circumference of the outlet opening respectively the entire surface of the outlet opening.

Particularly preferably, the hub flange encloses the outlet opening integrally and in particular comprising one single, integral material. The outlet opening is in particular worked into the hub flange in the form of a recess showing a closed circumference. Preferably a hub flange wall configured as one piece encloses the entire circumference of the outlet opening. The outlet opening is in particular entirely closed in the peripheral direction. The hub flange is preferably fixedly connected, and it may in particular be configured integrally, with the hub shell. The hub flange is preferably made of one piece.

These configurations may ensure high stability of the hub flange including in the outlet opening region. The stability achieved in this way is in particular better than for example in the case of (firstly) circumferentially open outlet openings which are then covered by a lid or the like to show a circumferentially closed effect. As a rule, these lids cannot contribute to the stability of the flange as advantageously as can a one-piece wall in the region of the outlet opening.

Particularly preferably, the outlet opening comprises at least one defined opening cross-section. The opening cross-section is in particular suitable and configured to accommodate two spokes axially offset to one another so that the spokes may cross each other. Preferably, the accommodation sections assigned to the shared outlet opening are disposed offset relative to a peripheral line of the hub flange. This allows particular ease of accommodating the spokes at an axial offset.

It is possible for the spoke feed-throughs assigned to the outlet opening to likewise be offset relative to a peripheral line of the hub flange. For example, an accommodation section respectively an accommodated spoke is disposed axially further inwardly relative to the peripheral line than is the other of the accommodation sections respectively the other of the spokes of the shared outlet opening. The outlet opening for example, shows an axial extension that is configured for a pair of axially offset and in particular crossed spokes.

The axial offset is preferably adapted to a cross-section of the spokes to be accommodated. The axial offset is in particular adapted so that the crossed spokes contact one another in a crossing point. It is possible for an axial movement of at least one of the two spokes to be prohibited by the other of the spokes and by a wall of the hub flange enclosing the outlet opening. Thus, the spoke is reliably clamped between the hub flange and the other of the spokes. Particularly preferably, the offset is configured such that the accommodated spokes contact one another in the crossing point.

Preferably, the spoke feed-throughs of one shared outlet opening show crossed longitudinal axes so that spokes accommodated therein can cross. The spoke feed-throughs are in particular provided with one shared, circumferentially closed outlet opening comprising crossed longitudinal axes. One shared outlet opening for crossed spokes is particularly preferred since it only requires minimum recesses in the hub flange.

Particularly preferably, the outlet opening shows an opening cross-section into which at least one spoke to be accommodated can be inserted from an axially outwardly surface of the hub flange. Insertion is in particular provided (preferably linear) without bending the spoke. Insertion will in particular be in the longitudinal direction of the spoke. Such an outlet opening allows for particular ease and speed of spoking. To this end for example, the opening cross-section of the outlet opening shows a controlled widening. The opening cross-section is in particular widened such that a spoke can be inserted in an oblique or inclined orientation.

The opening cross-section enabling to insert a spoke from an axially outwardly surface of the hub flange shows the particular advantage of time-saving and easy spoking of the hub. Moreover, there is the particular advantage of enabling a particularly compact and stable configuration of the outlet opening and in particular also of the entire hub flange. Namely, if the spokes cannot be inserted like this, the spokes need to be inserted from the direction of the rim with their spoke head first. This would require for the outlet opening to be dimensioned accordingly for the spoke head to pass through. This may weaken the hub flange. A spoke head capable of passing through the outlet opening moreover involves the risk of a spoke unintentionally exiting.

The outlet opening in particular shows an opening cross-section which is configured such that at least one spoke to be accommodated can be inserted only from an axially outwardly surface of the hub flange. In particular, the at least two spokes extending through the shared outlet opening can only be inserted from an axially outwardly surface of the hub flange. Alternately, it is also possible at least for the first spoke accommodated to also be inserted from the radial top face or with the spoke head first.

The outlet opening in particular shows an opening cross-section which is configured such that a spoke head of an accommodated spoke cannot pass through. The outlet opening in particular has an opening cross-section that is configured narrower than a spoke head of an accommodated spoke. Alternately, it is possible for a spoke head of a spoke to be accommodated to be prohibited from passing through the outlet opening only if another spoke is already accommodated in the outlet opening.

The opening cross-section preferably allows to insert at least one spoke from an axially outwardly surface of the hub flange if a spoke is already disposed in the outlet opening. To this end the opening cross-section may for example show at least one further cross-section expansion.

A conceivable configuration provides for a spoke to be disposed in the outlet opening axially further inwardly than the other spoke. The opening cross-section is preferably configured such that the axially outwardly spoke can be inserted if the axially inwardly spoke is already disposed in the outlet opening. The spokes are preferably inserted with their ends opposite the (in particular flattened) spoke heads first.

In all the configurations, it is preferred for the outlet opening to have an opening cross-section that provides at least one elongated hole each for both of the spokes to be accommodated. One single elongated hole may show a cross-section that is larger than a spoke cross-section. The two elongated holes together enable in particular both spokes to pass through. At any rate the cross-sections respectively opening cross-sections need to be configured so as to allow mounting both spokes. One single elongated hole may be smaller than the cross-section of one single spoke if the other of the elongated holes shows a correspondingly larger cross-section.

For example, the opening cross-section comprises two elongated holes configured oval. An oval elongated hole may for example show a cross-section composed of two circular arcs enclosing a rectangular central piece. Alternately, an elongated hole showing an elliptic cross-section or an asymmetrically oval cross-section is also possible. This type of outlet opening only requires a small-surface recess in the hub flange while still offering ease of insertion of the spokes.

Each of the elongated holes comprises in particular at least two sections. A first section is in particular provided as a cross-sectional expansion for inserting the spoke during mounting. A second section of the elongated hole is preferably provided for the accommodated, mounted spoke. This allows insertion of the spokes from axially outwardly even if the hub flange shows but a small diameter. The first section may be larger in its cross-section or diameter than the second section.

Preferably, an elongated hole comprises at least one through bore as a spoke feed-through and at least one dip sunk into the hub flange. Preferably both of the elongated holes of the outlet opening are so configured. The dip is in particular sunk into the hub flange adjacent to the through bore. The dip is in particular suitable and configured to provide free space for inserting the spokes. The dip thus allows to insert the spokes inclined without requiring large-surface bores which would weaken the hub flange. Alternately, it is possible to provide instead of the dip, a blind hole bore or a through bore.

A spoke can in particular be inserted even if another spoke is already accommodated. To this end, it may be provided for the already accommodated spoke to be disposed at least partially in the area of the dip to allow feeding the other spoke through.

The elongated holes are preferably oriented so that their longitudinal axes intersect. The longitudinal axis of an elongated hole extends in particular in the longitudinal direction of the cross-section of the elongated hole. The longitudinal axes of the elongated holes are in particular oriented transverse to the longitudinal axes of the accommodated spokes. Preferably, the longitudinal axes intersect so as to result in a substantially V-shaped and preferably V-shaped arrangement of the elongated holes relative to one another. The outlet opening in particular has an opening cross-section formed by a pair of elongated holes showing a V-shaped arrangement to one another. This configuration of the outlet opening allows particular ease of inserting spokes which are crossed when mounted. The spoke shaft of each of the spokes then preferably extends in the longitudinal direction of one of the elongated holes.

It is particularly preferred for the elongated holes to intersect at least in part. The outlet opening in particular shows an opening cross-section that forms by way of a pair of elongated holes arranged in a V to one another and intersecting at least in part. This intersection allows a particularly compact configuration of the outlet opening while also offering sufficient free space for mounting the spokes. The resulting outlet opening has a cross-section that is larger than a diameter of the spoke respectively the spoke shaft of the spoke concerned even if a central section of the (inner) diameter respectively the inner dimensions of the elongated hole is adapted to the (outer) diameter respectively the outer dimensions of the spoke. Adapted means in particular that the dimensions preferably differ by a maximum of 100% and in particular a maximum of 50% and particularly preferred a maximum of 20%.

In an advantageous specific embodiment at least part of the spoke feed-throughs show at least one axially open insertion section each. In particular, each of the spoke feed-throughs is provided with an axially open insertion section. The insertion section is in particular suitable and configured for inserting a spoke to be accommodated from an axially outwardly surface of the hub flange into the accommodation section at an inclination. The insertion section is preferably configured open on an axially outwardly surface.

This allows insertion of a spoke not only through the accommodation section but also through the axially open portion of the spoke feed-through. This allows inclined insertion of the spokes from the axially outwardly surface even if the hub flange is very small in diameter or if it is provided with a rotor or a brake accommodation.

The axially open insertion section preferably makes a circumferentially open transition to the accommodation section. In a configuration where the accommodation section is received in a take-up space, the insertion section preferably makes a circumferentially open transition into the take-up space. This achieves particularly good access to the spoke feed-through.

The insertion section preferably comprises a longitudinal axis extending substantially parallel and preferably parallel to a longitudinal axis of the pertaining spoke feed-through. Such an insertion section offers the option for a spoke already inserted into the spoke feed-through to protrude out of the accommodation section at an inclination. For example, the insertion section is worked into the spoke feed-through as a through-cut. Preferably, the through-cut also makes a transition to the accommodation section respectively the take-up space.

Preferably the accommodation sections are only disposed on one axial side face of the hub flange and in particular on an axially outwardly surface. The accommodation sections may be disposed on an axially outwardly surface and/or an axially inwardly surface of the hub flange. It is also possible for the accommodation sections to be disposed on both axial side faces of the hub flange. An arrangement on the axially outwardly surface allows particular ease of inserting the spokes. The outside surface is in particular the side face oriented toward an axial end of the hub. It is also preferred for the accommodation sections to be disposed circumferentially and in particular equally distributed over the circumference of the hub flange.

It is possible to configure in the hub flange at least one depression each between adjacent accommodation sections and in particular between accommodation sections comprising spoke feed-throughs with crossed longitudinal axes. The depression is in particular disposed on an axial side face and particularly preferably on an axially outwardly surface of the hub flange. It is also possible for the depression to be provided on an axially inwardly surface. It is possible for a hub flange to have no depression between accommodation sections showing spoke feed-throughs having non-crossed longitudinal axes. Alternately, it is possible to dispose at least one depression therein.

These depressions offer an advantageous weight reduction without adversely affecting stability. A depression between adjacent accommodation sections having spoke feed-throughs with crossed longitudinal axes is particularly advantageous, since the conventional dimensions of wheels provide for spacing between these accommodation sections anyway. This spacing is particularly well suited for a depression since sufficient material is provided in this place. The depression is in particular configured such that it is enclosed by sufficient material for the required engineering strength of the hub flange.

In all the configurations, it is particularly preferred to dispose the accommodation sections at least partially in at least one take-up space. The take-up space is in particular provided by at least one recess in the hub flange. These accommodation sections offer good access to the accommodation sections and moreover they enable an aerodynamically advantageous placement of the spoke heads.

The take-up space is preferably axially open and particularly preferably axially outwardly open. It is also possible for the take-up space to be axially inwardly open.

It is possible for the take-up space to be closed by at least one cover. In particular, all the take-up spaces of a hub flange can be closed by at least one shared cover. The take-up spaces of a hub flange may also be provided with two or more covers. It is also possible to provide at least one cover for each of the take-up spaces.

For example, an annular covering disk may be provided which is disposed on the axially outwardly surface of the hub flange. It may be provided for the cover to be detachably and preferably no-tools detachably disposed on the hub flange. It is also possible for the cover to be fixedly connected with the hub flange. For example, a connection by adhesive bond may be provided, for example a glued joint. Such a cover enables a particularly aerodynamic configuration of the hub flange.

The cover may also be fixedly or detachably disposed on the axle. The cover may for example be part of a limit stop that is non-rotatably or rotatably disposed on the axle and/or is attached, pushed on, or pushed in, or inserted into the axle. The cover is in particular rotatably supported relative to the hub shell. The cover is preferably non-rotatably attached to the axle and/or the limit stop. The cover and the limit stop may be configured as one piece. Alternately the cover may be disposed at, or be part of, a rotor. Alternately the cover may be attached to the hub shell. The cover may be removed for inserting or removing the spokes.

The take-up space is in particular enclosed by at least one axial backwall and by at least one at least partially circumferential sidewall. A circumferential sidewall forms a peripheral wall. The backwall is in particular provided by the axially outer wall of the hub flange ("bottom of the take-up space"). The sidewall extends in particular transverse to the backwall. The sidewall is in particular configured circumferential such that it is penetrated only by the spoke feed-through and/or the insertion section. The configuration with a backwall and a sidewall extending transverse thereto provides an easily accessible take-up space. Moreover, high stability of the hub flange is ensured even under dynamic loads and stresses.

The sidewall particularly preferably provides a tangential and/or radial ridge at least in sections. Such a ridge enables advantageous reinforcing of the hub flange as regards the expected tractive forces by the spokes. Particularly preferably, the sidewalls of adjacent take-up spaces provide at least one ridge respectively form a ridge between the sidewalls. Particularly preferably the hub flange does not show any circumferential groove and/or circumferential recess on the axial side faces and/or on the radial side face. An entirely circumferential groove may inadmissibly weaken the engineering strength of the hub flange.

It is possible that the depressions serving for weight reduction are also enclosed by at least one sidewall (may also be referred to as peripheral wall). Then preferably, at least one ridge is provided by way of the hub flange material between the sidewall of the depression and the sidewall of an adjacent take-up space. The hub flange is in particular provided with a plurality of take-up spaces and/or depressions enclosed by a sidewall each. The sidewalls respectively the material in-between at least partially together form a plurality of ridges in the hub flange. These ridges considerably reinforce the hub flange while the depressions serve for weight reduction.

In an advantageous configuration, at least some of the accommodation sections are preferably arranged in pairs in one take-up space each. In another configuration at least some of the accommodation sections are preferably provided singly in one take-up space each. In a conceivable and preferred configuration, the hub may show both take-up spaces having one accommodation section only and take-up spaces having pairs of accommodation sections. Take-up spaces having three or four or more accommodation sections are also conceivable. The quantity of the accommodation sections in the take-up spaces is preferably specified taking into account the expected forces acting on the hub flange, for example depending on whether the wheel is or is not driven.

A hub is in particular provided, comprising at least one hub flange having take-up spaces solely showing pairs of accommodation sections. This configuration is in particular provided for a hub flange whose diameter is reduced over another hub flange of the hub. The hub in particular comprises at least one hub flange having take-up spaces in which the accommodation sections are solely disposed singly. It is preferably a hub flange on the rotor side and/or brake side that is so configured.

Particularly preferably, a hub is provided comprising a (the first) hub flange having take-up spaces solely with pairs of accommodation sections and comprising another (or the second) hub flange having take-up spaces solely with singly arranged accommodation sections.

In all the configurations, it is particularly preferred for at least one receiving pocket having at least one undercut to be arranged in the take-up space. The receiving pocket is in particular suitable and configured to retain the spoke head and preferably a flattened spoke head non-rotatably. In particular, (exactly) one receiving pocket is assigned to each of the accommodation sections. The receiving pocket is preferably matched to the (e.g. flattened) cross-section of the spoke head. In particular, the receiving pocket is matched to a cross-section of the spoke head extending in parallel to the longitudinal axis of the spoke. Spokes showing an angular, polygonal, round, rounded, and in particular non-flattened spoke head may also be provided.

Preferably, the (in particular flattened) spoke head comprises two curved legs. The legs are in particular convexly curved in at least one axis. The receiving pocket for accommodating the legs shows correspondingly curved sections. Such a receiving pocket achieves even adjoining of the spoke and thus good form-fit and good force introduction.

It is possible for the receiving pocket to be suitable and configured to at least partially deform under the influence of an accommodated spoke. Such deforming occurs in particular if the hub is accommodated in a wheel provided with spokes. This subsequent deforming achieves a particularly close form-fit. The receiving pocket respectively the enclosing material consists for example of an aluminium alloy and the spoke is made of a steel alloy.

The receiving pocket preferably comprises at least two opposite placing sections. An accommodated spoke head can in particular be non-rotatably placed against the placing sections by one of its side edges. The opposite placing sections effectively prohibit rotation in both rotational directions. Particularly preferably, at least one placing section is broken by means of the spoke feed-through. The placing section is in particular configured such that the accommodated spoke can be non-rotatably placed by way of a flattened side face of the spoke head.

In particular, the hub flange is suitable and configured to accommodate tangentially aligned spokes. The spokes may be crossed once, alternately multiple times. a (purely) radial spoke guide is possible.

In a preferred configuration, the receiving pocket intersects in sections with the axially open insertion section. Then, the receiving pocket is configured axially open in particular in sections. This intersection of the receiving pocket and the insertion section allows a particularly compact configuration of the hub flange.

In particular, two spoke feed-throughs each are provided with one shared and circumferentially closed outlet opening in the hub flange so that two spokes can exit the hub flange in the direction toward the rim through one single, shared outlet opening. The spoke feed-throughs terminating in one shared outlet opening are preferably disposed inclined to one another so that their longitudinal axes converge. The longitudinal axes are in particular crossed in the region of the outlet opening or in a crossing point lying radially above.

The outlet opening is in particular disposed at least partially and preferably entirely on a radial side face of the hub flange. The outlet opening is in particular delimited from an axial side face of the hub flange by means of a closed peripheral line. This offers a particularly sturdy hub flange. Preferably, the hub flange is circularly or circumferentially closed in the transition from the axial side face to the radial side face. The hub flange in particular does not comprise any punched holes and/or recesses respectively bores in the transition from the axial side face to the radial side face. The outlet opening is in particular disposed on the radial side face of the hub flange so that a spoke can only exit on the radial but not on an axial side face of the hub flange.

It is preferred for the spoke feed-throughs to extend radially and/or tangentially in the hub flange. The longitudinal axes of the spoke feed-throughs in particular extend in the radial and/or tangential direction in the hub flange. Such a hub enables wheels that are both particularly durable and lightweight.

In a front wheel hub, the longitudinal axes extend in particular e.g. radially. In a hub for a rear wheel respectively, a driven wheel the longitudinal axes extend for example tangentially or alternately, partially tangentially and partially radially. The longitudinal axes of the spoke feed-throughs in particular only extend in the radial and/or tangential directions but not in the axial direction in the hub flange. This allows employment of the hub particularly well with non-cranked spokes so as to obtain particularly high stability.

The hub comprises in particular at least one spoke. The spoke is in particular straight or non-cranked. Alternately, the spoke may be cranked. Preferably, the hub comprises at least one spoke having a flattened spoke head. Alternately, at least one spoke having a non-flattened spoke head may be comprised, e.g. an angular, polygonal, round and/or rounded spoke head. The spoke preferably follows the direction of its spoke feed-through. The spoke shows in particular one single spoke body respectively spoke shaft. The spoke is in particular not tied nor attached to another spoke.

Preferably, the hub shell and the at least one hub flange are configured integrally. The hub in particular comprises two hub flanges both of which are preferably integrally connected with the hub shell. Preferably, the hub shell and the at least one hub flange are made of one piece.

The wheel according to the invention comprises the hub according to the invention described above. The wheel in particular comprises a rim and a plurality of spokes.

The wheel according to the invention also shows many advantages. A particular advantage is provided by the shared, circumferentially closed outlet openings. These convey high stability to the wheel and secure accommodation of the spokes.

In an advantageous configuration of the wheel, the outlet opening comprises an opening cross-section in which two spokes can be accommodated axially offset to one another. The accommodated spokes are in particular crossed. The spokes are in particular accommodated in spoke feed-throughs with crossed longitudinal axes. The longitudinal axes are in particular crossed in an imaginary extension outside of the spoke feed-throughs. Each spoke is preferably accommodated in an elongated hole. The elongated holes of an outlet opening are in particular intersecting. The spokes are in particular disposed offset relative to a peripheral line of the hub flange. One of the spokes preferably lies axially farther inwardly and another spoke, axially farther outwardly. The two spokes in particular contact one another axially.

The spokes preferably exit from the hub flange in the radial and/or tangential but preferably not in the axial direction. The spokes are in particular straight or non-cranked. This wheel is particularly durable and sturdy. The spokes exit in particular on a radial side face of the hub flange. The axle may be configured as a conventional axle or alternately as a through axle.

BRIEF DESCRIPTION OF THE DRAWINGS

Further advantages and features of the present invention can be taken from the description of the exemplary embodiments which will be discussed below with reference to the enclosed figures.

The figures show in.

DETAILED DESCRIPTION

Figure 1:
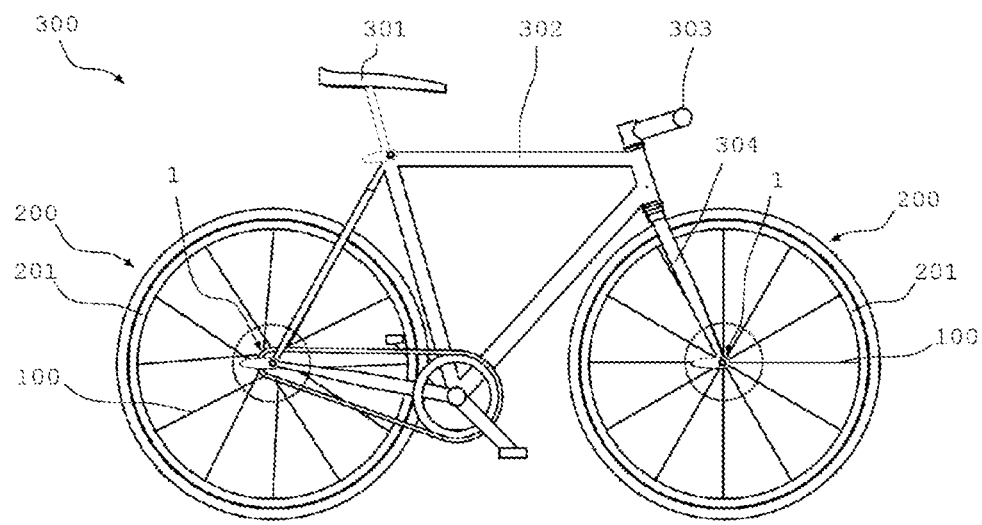
FIG. 1 a schematic side view of a bicycle.

FIG. 1 shows a simplistic illustration of a bicycle 300 which in this case is a racing bicycle or a roadster. The bicycle 300 may be configured as a mountain bike and/or a partially muscle-powered two-wheeled vehicle and for example an e-bike. The bicycle 300 comprises two wheels 200 which are equipped with a hub 1 according to the invention.

Furthermore, the bicycle 300 comprises a saddle 301, a frame 302, a handlebar 303 and a fork 304, and further bicycle components. This bicycle 300 comprises a chain-shifting device or derailleur as part of a drive. For a derailleur, the hub 1 may for example comprise a rotor which can accommodate individual sprockets or a cassette respectively. The bicycle 300 further comprises a brake device. To this end, the hubs 1 of the two wheels 200 may be provided with a brake accommodation 31 each for non-rotatably mounting a brake disk. The wheels 200 configured as a front wheel and a rear wheel are each attached to dropouts of the fork 304 respectively the frame 302.

The wheels 200 each comprise a rim 201 and a plurality of spokes 100. The spokes 100 are fixed to the hub 1 with one of their ends and with the other end, to the rim 201. The spokes 100 shown are configured as straight or non-cranked spokes 100. Blade spokes 104 are preferably provided. The spokes 100 each comprise a spoke body 101 having a flattened spoke head 102, which is received, presently not visible, in the hub 1.

The FIGS. 2 to 7 illustrate various views of a hub 1 according to the invention in detail. The hub 1 may be part of a wheel 200. For better clarity, not all of the spokes 100 provided are illustrated.

The hub 1 comprises two hub flanges 2, 12, received on a hub shell 11. The hub shell 11 is supported rotatably relative to an axle 21 of the hub 1. A brake accommodation 31 is attached to the hub shell 11 for fastening brake disks.

The hub flanges 2, 12 comprise a plurality of accommodation sections 3 for receiving one spoke head 102 each. The hub flanges 2, 12 are configured for receiving non-cranked or straight spokes 100. The spokes 100 emerge from the accommodation sections 3 through a spoke feed-through 5 in the direction of the rim 201.

The spoke feed-throughs 5 have a longitudinal axis that is oriented so as to show a tangential orientation of the spokes 100 in the wheel 200. Alternately, radial spoke insertion may be provided. Moreover, the arrangement of the accommodation sections 3 respectively the orientation of the spoke feed-through 5 are chosen such that a spoke 100 crosses another spoke 100 at least once.

This hub 1 comprises accommodation sections 3 having one circumferentially closed spoke feed-through 5 each. The spoke feed-throughs 5 each comprise a through bore 35.

The hub flanges 2, 12 are equipped with take-up spaces 7 in which pairs of accommodation sections 3 are disposed. Moreover, two spoke feed-throughs 5 are assigned to each take-up space 7 so that each accommodation section 3 is provided with one spoke feed-through 5.

The hub flanges 2, 12 may also have take-up spaces 7 comprising only one single accommodation section 3 each. The longitudinal axes of the spoke feed-throughs 5 of a take-up space 7 extend such that the spokes 100 received in a take-up space 7 emerge from the hub flanges 2, 12 in opposite directions and thus they are not crossed.

These take-up spaces 7 are configured to be open relative to an axially outwardly side face 22 of the hub flanges 2, 12. Correspondingly, the accommodation sections 3 are only disposed on the axially outwardly surface 22 of the hub flanges 2, 12. Each of these take-up spaces 7 is enclosed by an axial backwall 17 and by a sidewall 27 extending transverse to the backwall 17. The axial backwall 17 forms a "bottom" of the take-up spaces 7. The sidewall 27 may also be referred to as peripheral wall. The backwall 17 is provided by the axially outwardly surface 22 of the hub flanges 2, 12. The sidewalls 27 enclose the respective take-up spaces 7 and they are broken by the spoke feed-throughs 5 of the accommodation sections 3 disposed in the take-up space 7.

The sidewalls 27 of the take-up spaces 7 provide ridges 37 respectively enclosures. The ridges extend substantially tangentially and in particular tangentially. The sidewalls 27 of adjacent take-up spaces 7 together provide one ridge 37 each.

Depressions 62 are worked into the axially outwardly surface 22 of the hub flanges 2, 12 between the take-up spaces 7 for weight reduction. The depressions 62 are enclosed by a peripheral sidewall 27 (peripheral wall) and they also form ridges 37 together with the sidewalls 27 of the adjacent take-up spaces 7.

The arrangement of the accommodation sections 3 in a plurality of take-up spaces 7 results in a very stable and sturdy structural architecture of the hub flanges 2, 12. This allows omission of continuous recesses for receiving the spokes 100 which would weaken the overall stability of the hub flanges 2, 12. The enclosing sidewalls 27 and the ridges 37 disposed between the take-up spaces 7 allow good absorption and dissipation of the occurring tractive forces. Since, the depressions 62 for weight reduction are likewise enclosed by sidewalls 27 respectively bordered by ridges 37, they also advantageously contribute to stability.

The hub flanges 2, 12 comprise circumferentially closed outlet openings 9. Spokes 100 received in the accommodation sections 3 can be guided through these out of the hub flanges 2, 12 toward a rim 201 in the tangential direction. The outlet openings 9 are disposed on the radial top face 52 of the hub flanges 2, 12. The axial side faces 22, 32 are not provided with outlet openings 9.

Two spoke feed-throughs 5 each are provided with one joint outlet opening 9 so that two spokes 100 can emerge from the hub flanges 2, 12 through one outlet opening 9. The hub flanges 2, 12 enclose the outlet opening 9, presently integrally. This achieves particularly high stability of the hub flange 2.

Each of the outlet openings 9 has two spoke feed-throughs 5 assigned to it which originate from different take-up spaces 7. The accommodation sections 3 and spoke feed-throughs 5 disposed in one take-up space 7 are each provided with different, separate outlet openings 9. In the hub 1 presently shown the spoke feed-throughs 5 of adjacent take-up spaces 7 are assigned to one outlet opening 9 each. Thus, continuous or large-surface recesses which would weaken the hub flanges 2, 12 on the whole, may be advantageously dispensed with. Moreover, the quantity of required bores or recesses may be considerably reduced.

The opening cross-section 19 of the outlet openings 9 is matched to the cross-section of the spokes 100. This allows axially offset arrangement of spokes 100. To this end, an arrangement of the accommodation sections 3 showing an offset 421 relative to a peripheral line 42 of the hub flanges 2, 12 is provided. The offset 421 is particularly clearly shown in FIG. 3. In this way, it is possible for the accommodated spokes 100 to be crossed. Moreover, the longitudinal axes of the spoke feed-throughs 5 are provided to be aligned correspondingly.

It is another advantage of the offset 421 that the crossed spokes 100 can be disposed closely adjacent to one another so as to enable a narrow and thus lightweight hub flange 2, 12 so as to also improve the sturdiness of the wheel 200.

The hub 1 presently shown allows a crossing point 25 which lies particularly close to the outlet opening 9 or preferably even within the outlet opening 9. To this end, the outlet openings 9 are provided with a correspondingly adapted opening cross-section 19 so as to provide sufficient space for the crossing point 25. This enables a particularly compact and optically appealing and aerodynamic architecture.

The spokes 100 shown are preferably configured as blade spokes 104. The blade spokes 104 comprise a central, flattened shaft section 124 that is enclosed by two cylindrical shaft sections 114. The above described arrangement of the crossing point 25 achieves that the crossing point 25 lies in the region of the cylindrical shaft section 114 of the crossed spokes 100. This shows an advantageous effect on the durability of the wheel 20.

Figure 6:
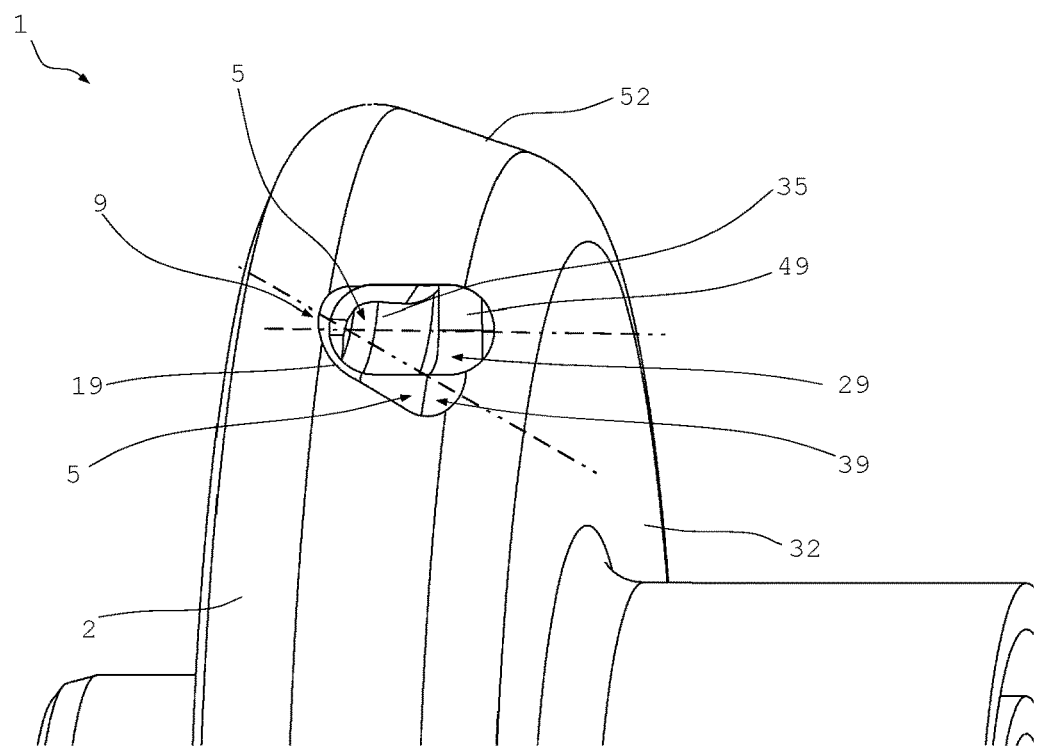
FIG. 6 a schematic detail of the hub in a perspective view.
Figure 7:
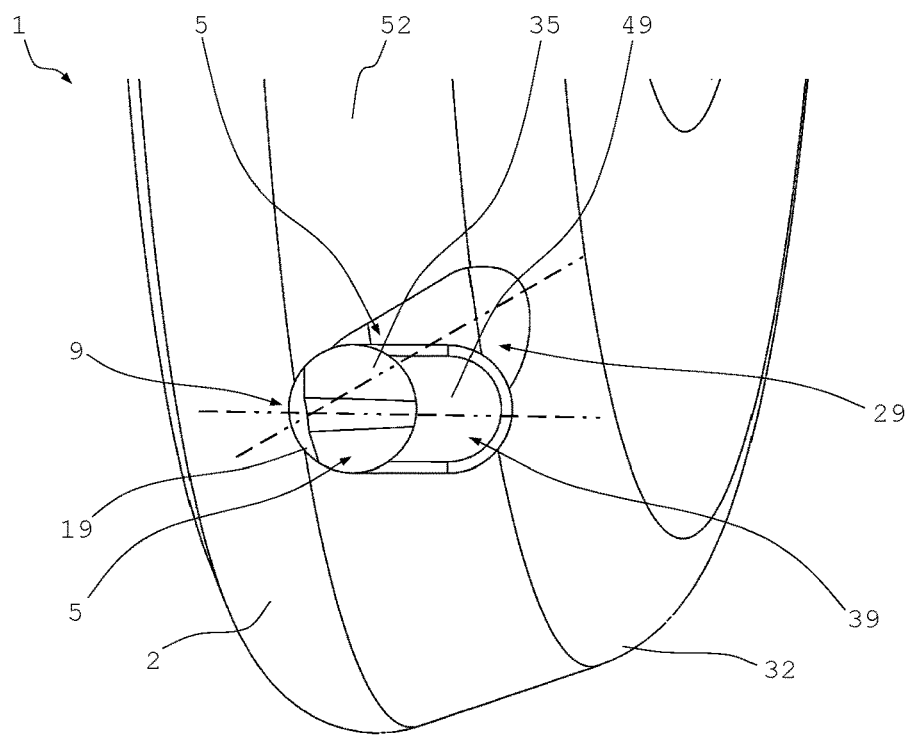
FIG. 7 a schematic detail of the hub in another perspective view.

The opening cross-sections 19 of the outlet opening 9 are shown enlarged in the FIGS. 6 and 7. The opening cross-section 19 provides an elongated hole 29, 39 for each of the two spokes 100 emerging through the outlet opening 9. The opening cross-section 19 of the outlet opening 9 is thus composed of a pair of elongated holes 29, 39 which intersect in sections. The elongated holes 29, 39 shown are oval in configuration.

Each of the elongated holes 29, 39 provides a through bore 35 for the spoke feed-through. Moreover, each elongated hole 29, 39 has assigned to it a dip 49 worked into the hub flange 2, 12. The dip 49 forms a free space into which the spoke 100 can be temporarily pushed during inserting in assembling. Due to this dip 49, the spoke 100 can be inserted inclined in assembling without hitting against the hub flanges 2, 12. Moreover, the spoke 100 may back into the region of the dip 49 as the second spoke 100 is inserted.

When the wheel 200 is mounted, the spoke 100 then extends outside of the dip 49 through the outlet opening 9.

The two elongated holes 29, 39 show intersecting longitudinal axes. For better clarity, the longitudinal axes are shown in broken/dotted lines. This arrangement of the longitudinal axes results in a V-shaped orientation of the elongated holes 29, 39 relative to one another. The angle of the intersecting longitudinal axes of the elongated holes 29, 39 is preferably matched to the tangential angle of emergence of the spokes 100.

FIG. 6 shows in a broken line the circumference of the elongated hole 29 provided for the axially inwardly spoke 100. FIG. 7 shows in a broken line the circumference of the elongated hole 39 provided for the axially outwardly spoke 100. The elongated holes 29, 39 are partially intersecting. This allows keeping the opening cross-section 19 particularly small, while still offering sufficient space for receiving the spokes 100.

The take-up spaces 7 are preferably configured the most compact possible to not weaken the stability of the hub flanges 2, 12 by large-surface recesses. Insertion sections 59 are provided to allow inserting the spokes 100 from the axially outwardly surface 22 at an incline into the accommodation sections 3 respectively spoke feed-throughs 5 despite the compact take-up spaces 7.

Figure 5:
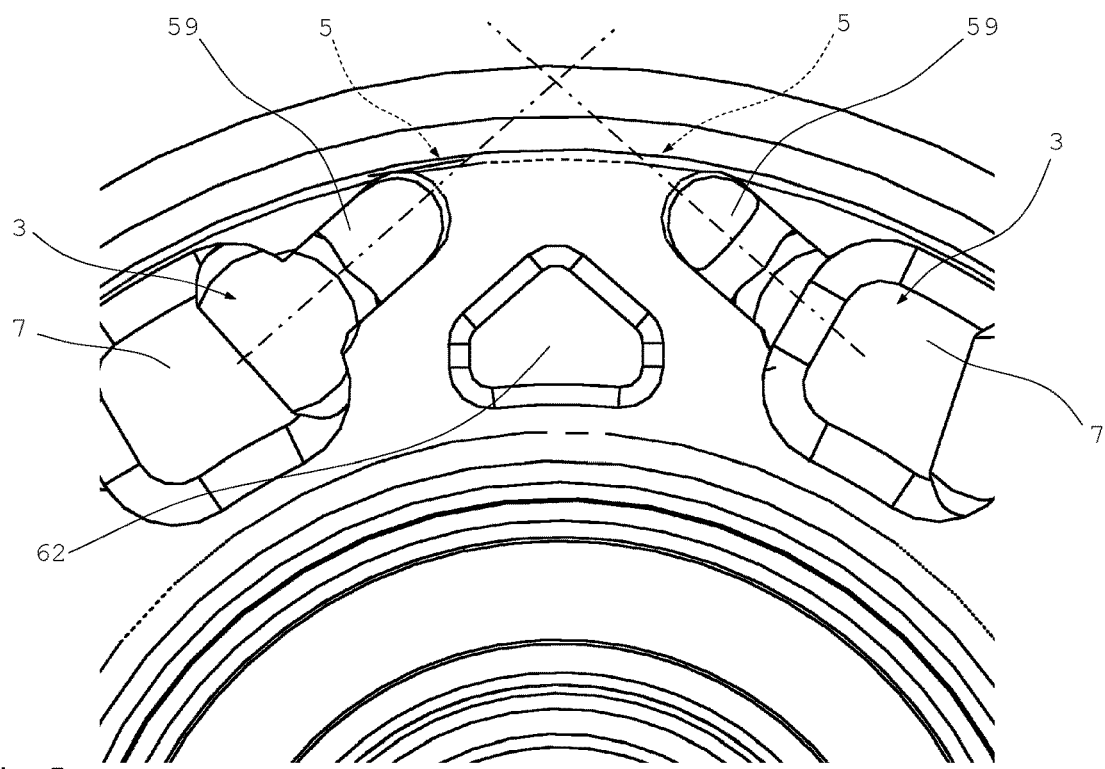
FIG. 5 an enlarged detail of the illustration in FIG. 4.

The insertion sections 59 can be seen particularly clearly in FIG. 5. For better clarity, two insertion sections 59 of two adjacent take-up spaces 7 are shown within broken lines.

The insertion sections 59 are configured axially open respectively as openings at the axially outwardly surfaces 22 of the hub flanges 2,12. The insertion sections 59 are worked into the axially outwardly surfaces 22 of the hub flanges 2, 12 as elongated through-cuts. The insertion sections 59 make a circumferentially open transition into the take-up spaces 7 respectively into the embedded accommodation sections 3. This allows to push the spoke 100 firstly through the insertion section 59 into the spoke feed-through 5. When the spoke 100 has been pushed in far enough, the spoke head 102 can readily be inserted into the accommodation section 3 of the take-up space 7.

The spoke feed-through 5 and its insertion section 59 are aligned in parallel along their longitudinal axes. For better clarity, the longitudinal axes are shown as broken/dotted lines. This alignment of the insertion section 59 and the spoke feed-through 5 enhances ease of inserting the spokes 100.

At least one receiving pocket 8 showing at least one undercut 18 is disposed in the take-up spaces 7. This achieves a non-rotatable accommodation of the spoke head 102. The undercut 18 prohibits or largely inhibits an axial movement of the spoke head 102 accommodated therein. Moreover, the spoke 100 can no longer rotate or twist. This is particularly advantageous for blade spokes 104 whose aerodynamic advantages already deteriorate in the case of very minor twisting about their longitudinal axis.

Figure 8:
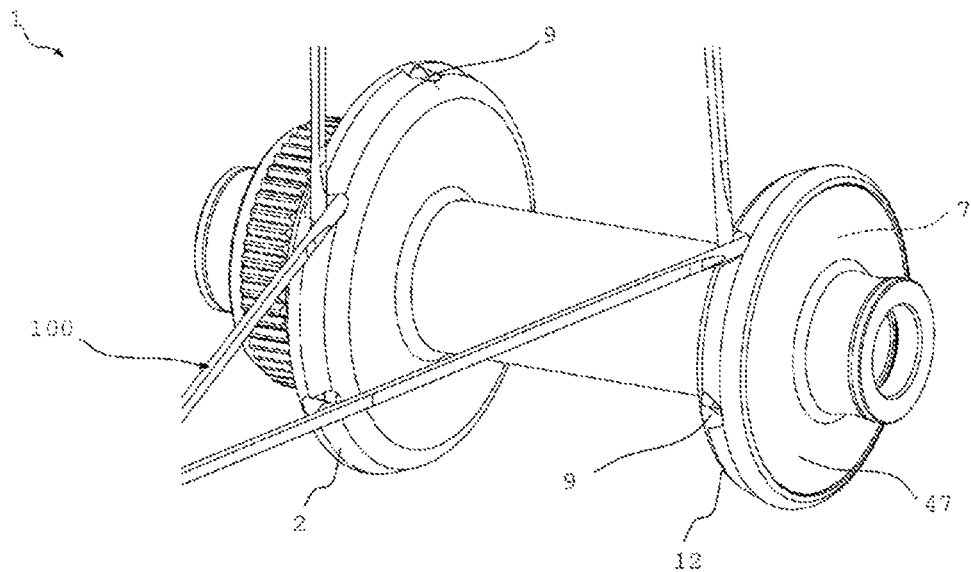
FIG. 8 a schematic illustration of a hub in a perspective view.

FIG. 8 shows a configuration of a hub 1 where the take-up spaces 7 are closed by a cover 47. The cover 47 is configured as an annular disk and it is placed after mounting the spokes 100. This cover 47 offers in particular aerodynamic advantages since the hub flanges 2, 12 are provided with a plane outside surface 22.

Figure 2:
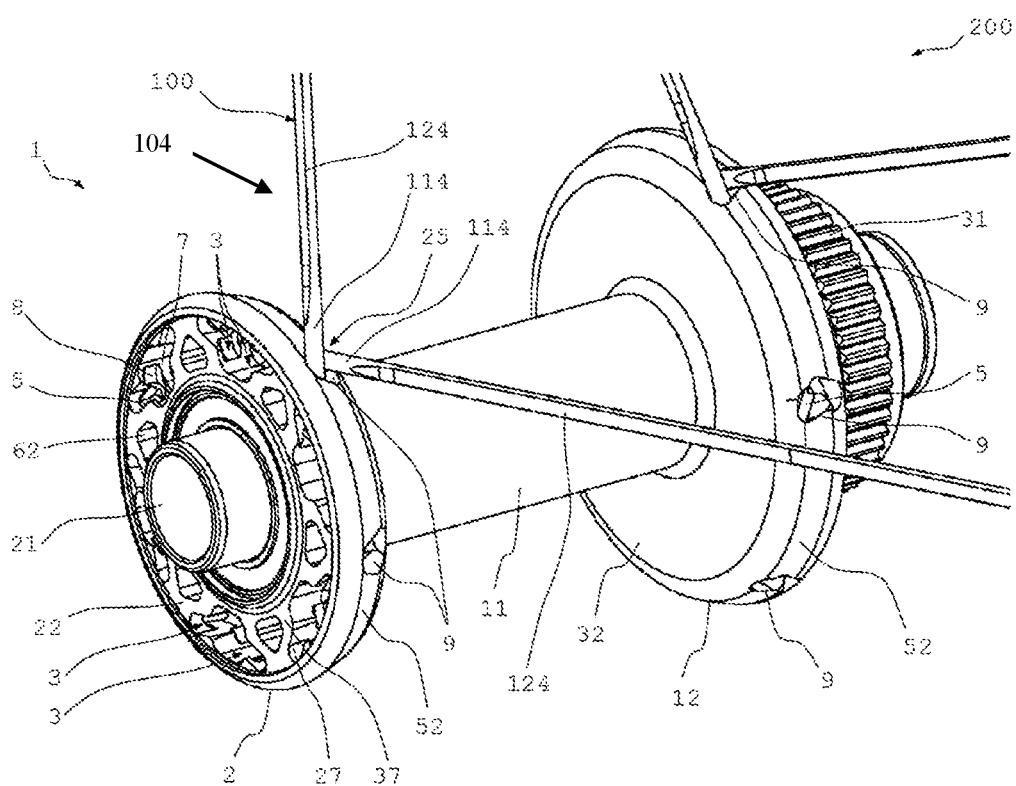
FIG. 2 a schematic illustration of a hub according to the invention in a perspective view.
Figure 3:
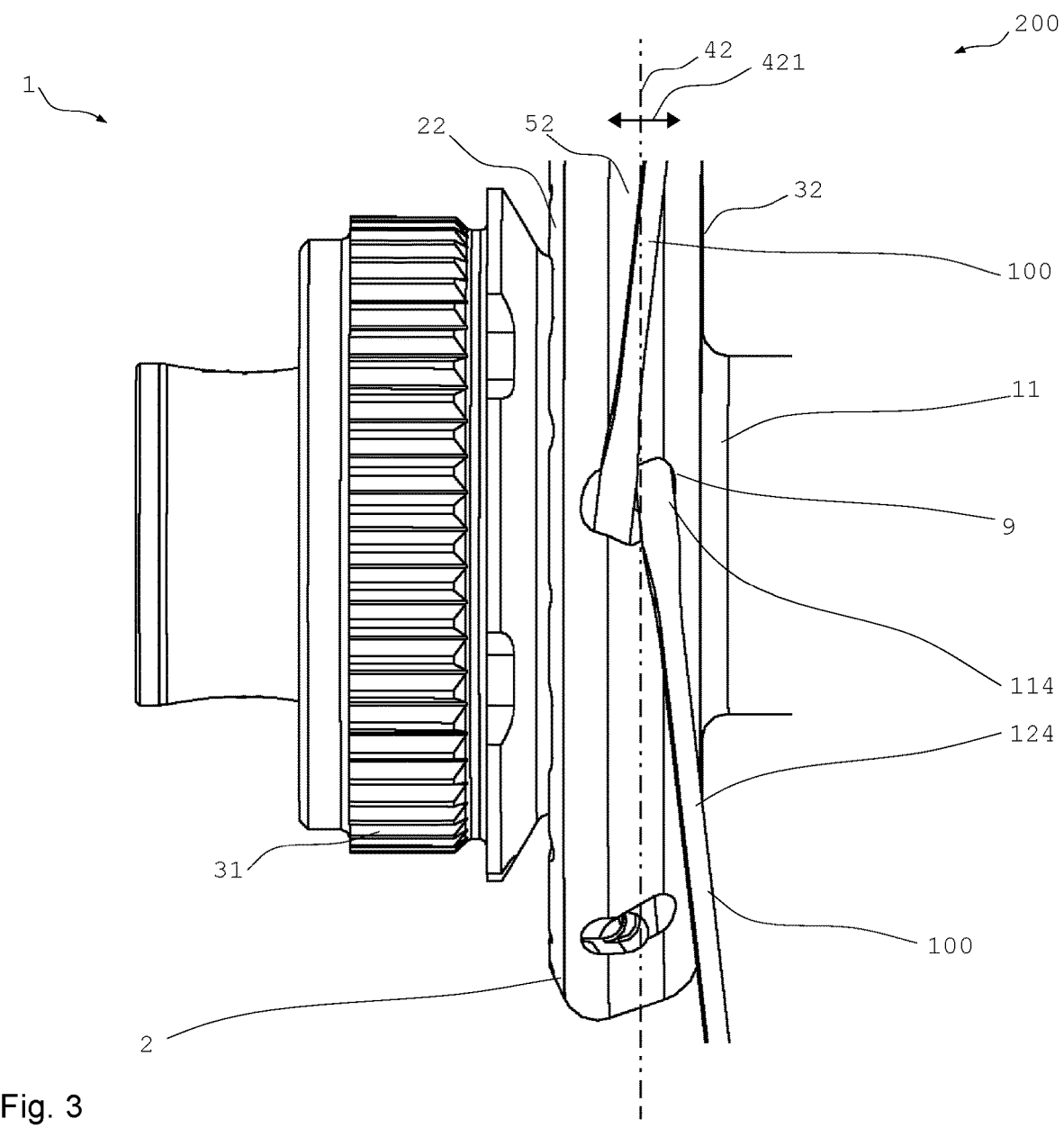
FIG. 3 a schematic detail of the hub in a front view.
Figure 4:
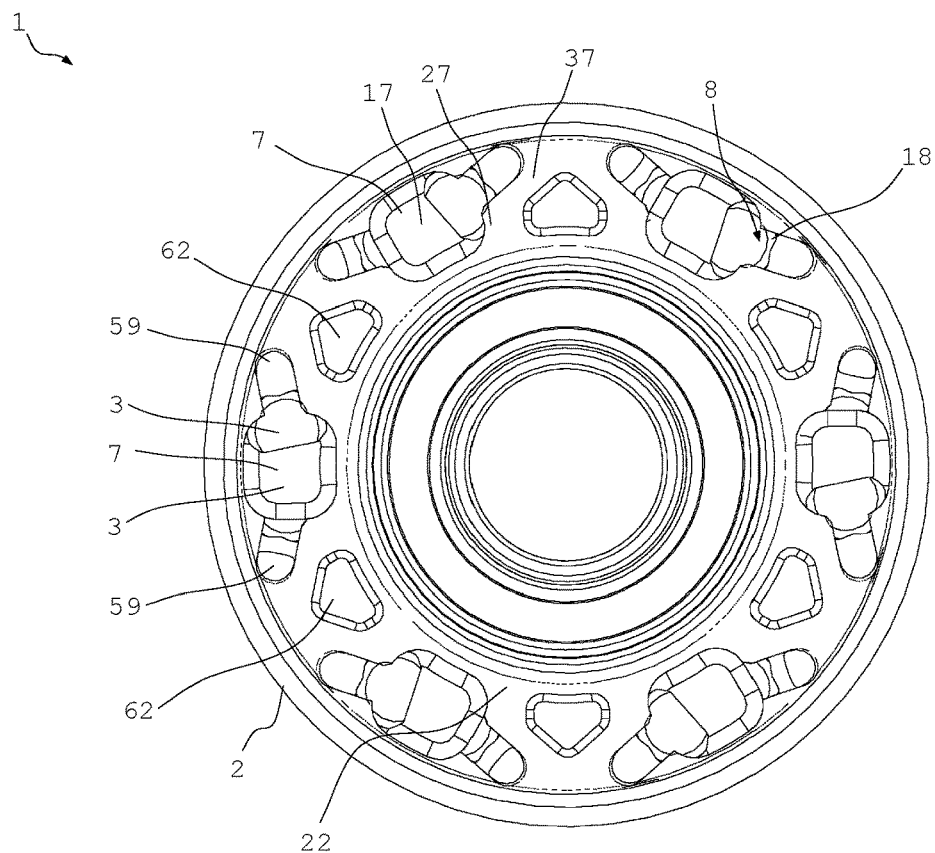
FIG. 4 a schematic illustration of the hub in a side view.
Figure 9:
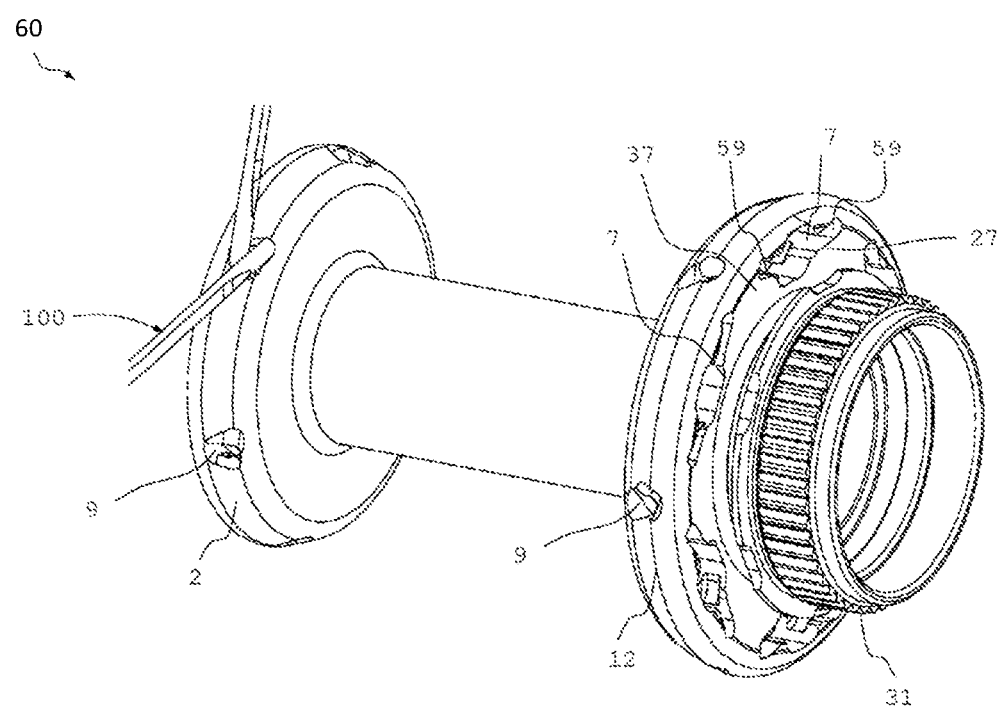
FIG. 9 a schematic illustration of another hub in a perspective view.

FIG. 9 shows a hub 60 where no depressions 62 are configured in the hub flanges 2, 12 for weight reduction. It is possible for depressions 62 to be configured in the opposite hub flange 2. This hub flange 2 may, for example be configured as it is shown in FIG. 2. A hub 60 having two differently configured hub flanges 2, 12 is particularly advantageous if a hub flange 12 is provided with a brake accommodation 31 and/or a rotor accommodation.

Figure 10:
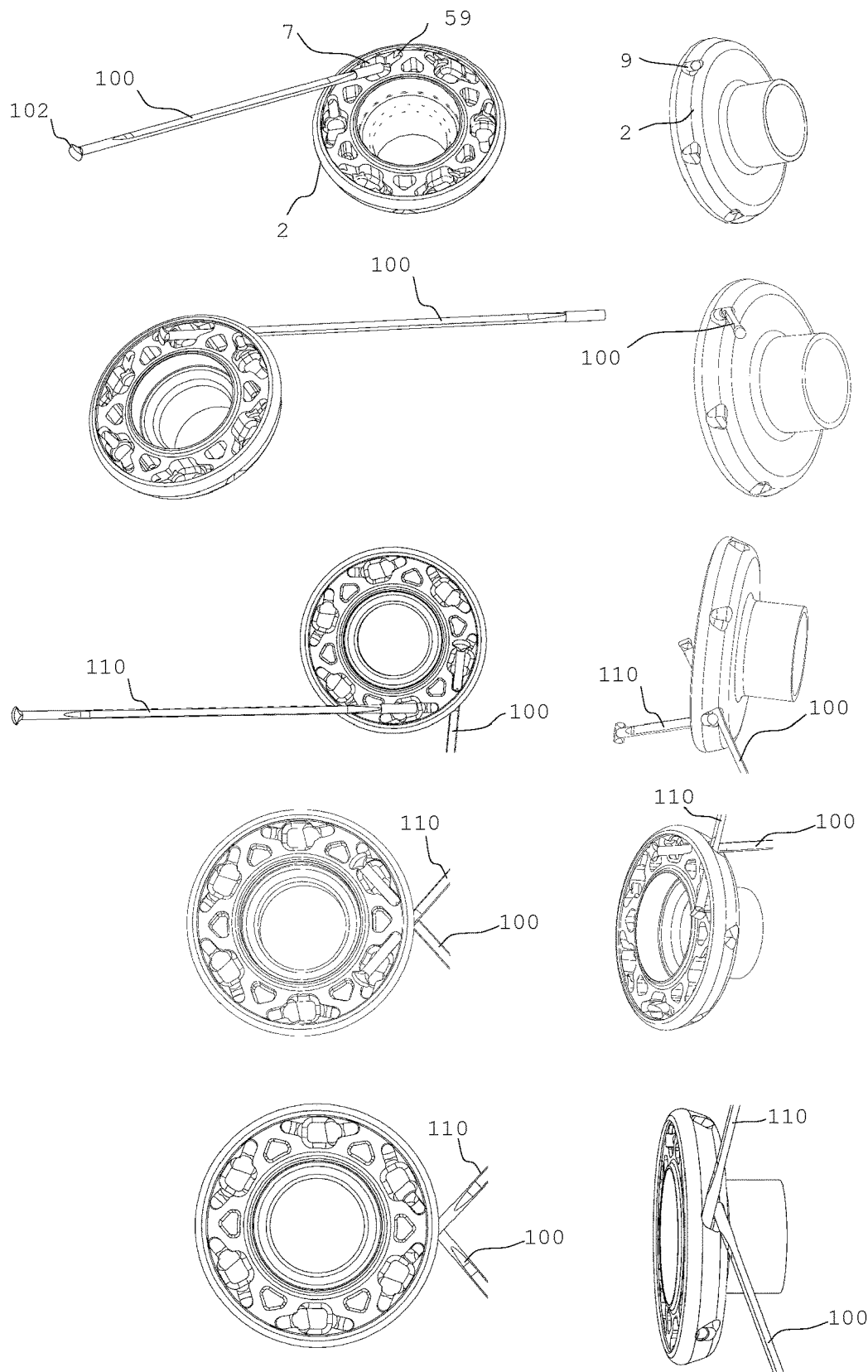
FIG. 10 schematic illustrations of the hub flange during insertion of spokes in a perspective view.

FIG. 10 shows a simplistic overview of mounting the spokes 100, 110 in the inventive hub 60, e.g. for manufacturing a wheel 200. A total of five different mounting steps are shown. Each mounting step is illustrated by two side-by-side illustrations of a hub flange 2.

The topmost mounting step shows a first spoke 100 being inserted into the hub flange 2. The end opposite the spoke head 102 is pushed into the spoke feed-through 5.

In the next mounting step, the spoke 100 is already pushed in further and exits from the hub flange 2 through the outlet opening 9 in the direction of a rim 201, which is not shown.

In a third mounting step, the second spoke 110 is inserted. Then, the first spoke 100 is tilted to provide sufficient space for the second spoke 110. The first spoke 100 is positioned such that its spoke head 102 end emerges axially outwardly 22 through the insertion section 59. Moreover, the spoke 100 is inclined so that it lies in the dip 59 of the elongated hole 29. In this position, there is sufficient space in the outlet opening 9 for the second spoke 110. Now it can be pushed in.

In the subsequent mounting step both the spokes 100, 110 are pushed in nearly completely. Since their spoke heads 102 are not yet disposed entirely in the take-up space 7 respectively in the receiving pocket 8 provided therein, the spokes 100, 110 are inclined accordingly. In this position both the spokes 100, 110 load their insertion section 59 and lie in the region of the dips 49 of their respective elongated holes 29, 39.

In the bottom pictures the mounting is concluded. The spokes 100, 110 are completely inserted and their spoke heads 102 lie non-rotatably in the undercuts 18 of the receiving pockets 8. Now, the spokes 100, 110 are no longer located in the insertion sections 59 and they extend with their longitudinal axis in parallel to the longitudinal axis of the spoke feed-through 5.

The outlet openings with the dips 49, the spoke feed-throughs 5 and the take-up spaces 7 and the depressions 62 are preferably worked into the hub body by way of boring or milling out. The receiving pocket 8 is preferably worked into the hub flanges 2, 12 by form milling.

The invention claimed is:

1. A hub comprising:
a hub shell for rotatable arrangement relative to an axle received in the hub shell, wherein the hub shell is provided with at least one circumferential hub flange that accommodates a plurality of spokes, said hub flange including a radial surface and an axial surface, said axial surface extending substantially transversely from said radial surface, each of said plurality of spokes including a spoke body and a spoke head, and wherein the hub flange comprises a plurality of accommodation sections, each of said plurality of accommodation sections configured for receiving one spoke head, the accommodation sections are disposed on said axial surface of the hub flange, and one spoke feed-through is associated with each of the accommodation sections, through which an accommodated spoke is guided out of the accommodation section, wherein the spoke feed-throughs extend through said radial surface of the hub flange and two spoke feed-throughs are each provided with one circumferentially closed joint outlet opening in the hub flange, wherein the hub flange integrally encloses the outlet opening.

2. The hub according to claim 1, wherein the outlet opening comprises an opening cross-section that is configured to accommodate two spokes axially offset to one another so that the spokes may cross each other.

3. The hub according to claim 1, wherein the outlet opening comprises an opening cross-section which is configured such that at least one spoke is inserted from an axially outwardly surface of the hub flange.

4. The hub according to the claim 3, wherein the outlet opening comprises an opening cross-section which is configured such that another spoke is inserted from an axially outwardly surface of the hub flange when one spoke is already disposed in the outlet opening.

5. The hub according to claim 1, wherein the outlet opening comprises an opening cross-section which provides an elongated hole for two spokes.

6. The hub according to claim 5, wherein at least one elongated hole is formed by a through bore of the spoke feed-through and a dip worked into the hub flange.

7. The hub according to claim 5, wherein the elongated holes comprise intersecting longitudinal axes forming a V-shaped arrangement of the elongated holes relative to one another.

8. The hub according to claim 5, wherein the elongated holes at least partially intersect.

9. The hub according to claim 1, wherein at least part of the spoke feed-throughs comprise an axially open insertion section each through which a spoke is inserted inclined from an axially outwardly surface of the hub flange into the accommodation section.

10. The hub according to claim 9, wherein the axially open insertion section makes a circumferentially open transition to the accommodation section.

11. The hub according to claim 9, wherein the insertion section defines a longitudinal axis which extends in parallel to a longitudinal axis of the pertaining spoke feed-through.

12. The hub according to claim 1, wherein at least one depression is configured between adjacent accommodation sections comprising spoke feed-throughs with crossed longitudinal axes.

13. The hub according to claim 1, wherein the accommodation sections are at least partially disposed in at least one take-up space and wherein the take-up space is configured axially open.

14. The hub according to claim 13, wherein the take-up space is closed by at least one cover.

15. The hub according to claim 13, wherein the take-up space is enclosed by at least one axial backwall and by at least one at least partially circumferential sidewall.

16. The hub according to claim 15, wherein the sidewall provides a radially or tangentially extending ridge at least in sections.

17. The hub according to claim 13, wherein at least one of the accommodation sections is disposed singly in one take-up space, and wherein at least two of the accommodation sections are disposed in another take-up space.

18. The hub according to claim 13, wherein at least one receiving pocket includes at least one undercut disposed in the take-up space which is configured to non-rotatably retain the spoke head.

19. The hub according to claim 18, wherein the receiving pocket intersects in sections with the axially open insertion section so that the receiving pocket is configured axially open in sections.

20. The hub according to claim 1, wherein the spoke feed-throughs extend radially or tangentially in the hub flanges.

21. A wheel with a hub according to claim 1.

22. The wheel according to claim 21, wherein the outlet opening comprises an opening cross-section in which two spokes are received axially offset to one another so that the spokes are crossed.

* * * * *